Sept. 10, 1929.                M. BILINSKI                  1,727,325
                                   TRAP
                           Filed May 19, 1927           3 Sheets-Sheet 2
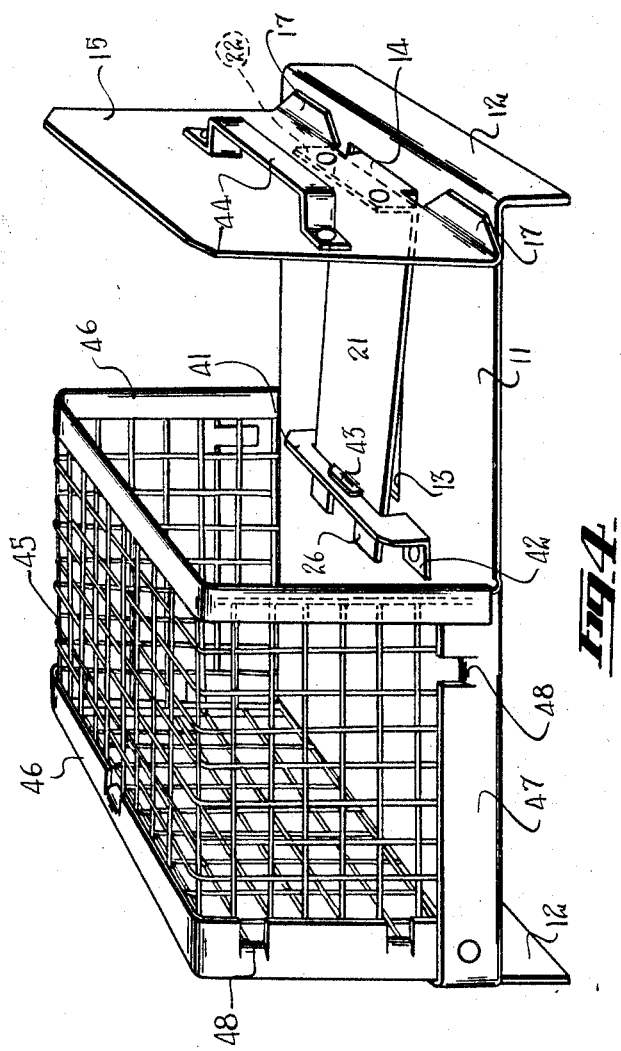

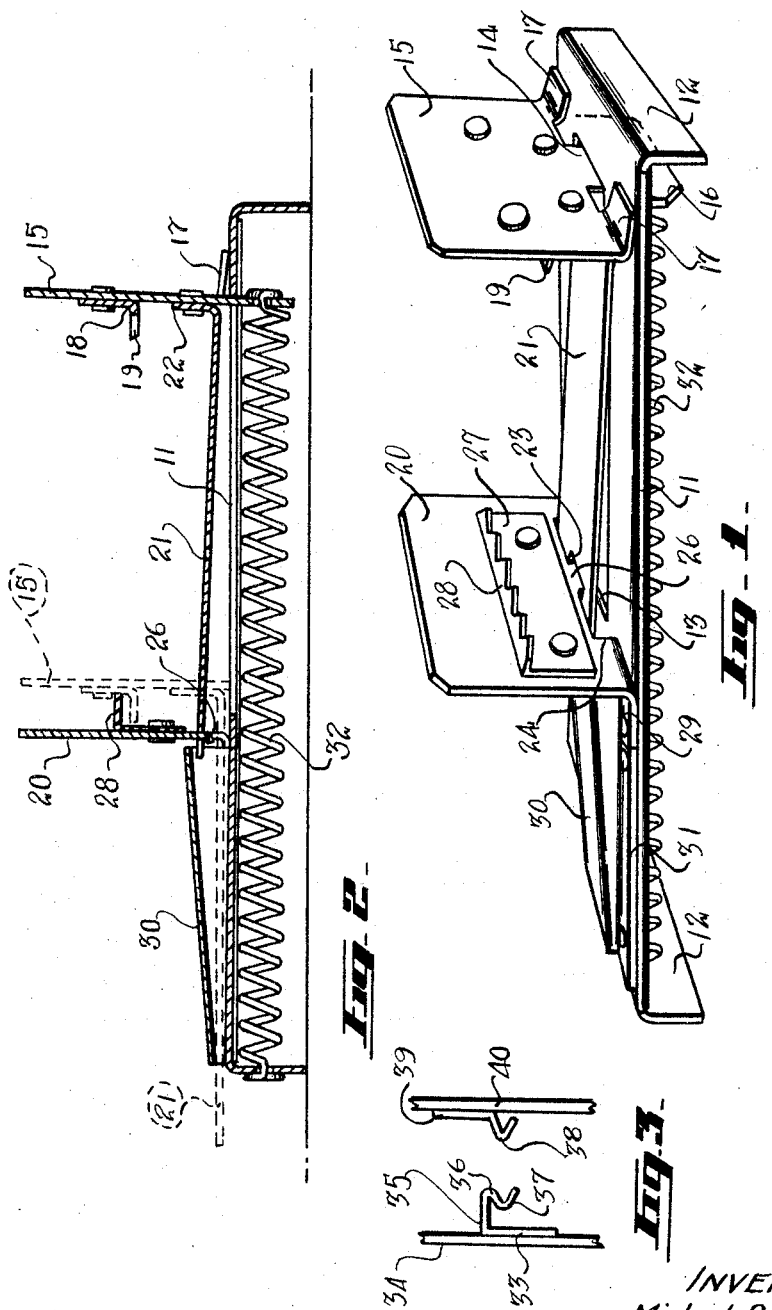

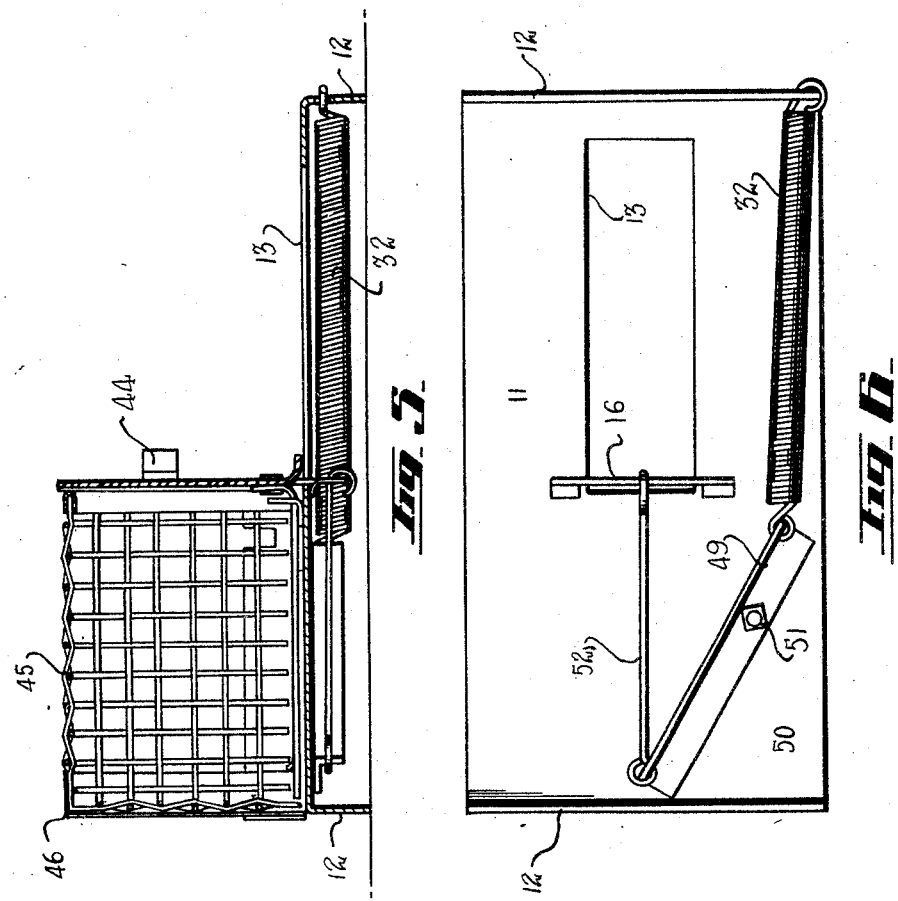

Patented Sept. 10, 1929.

1,727,325

UNITED STATES PATENT OFFICE.

MICHAL BILINSKI, OF OTTAWA, ONTARIO, CANADA, ASSIGNOR OF ONE-HALF TO WILLIAM HENRY WATTERS, OF TEMISKAMING, CANADA.

TRAP.

Application filed May 19, 1927. Serial No. 192,672.

This invention has relation to certain new and useful improvements in an animal trap of the spring actuated type and which is constructed so as to be highly efficient in operation with the minimum liability of serious injury to the victim.

Another object of the invention resides in the provision of an animal trap of the character stated which is of simple and inexpensive construction, and will be readily operated when the latch plate is released by the victim pressing thereon.

A further object of the invention resides in the provision of a trap of the character stated in which all parts are firmly united to produce a strong structure and assure prompt and efficient operation of the trap when sprung by the victim.

A still further object resides in the provision of a trap as described characterized by structural simplicity, positiveness of action and being capable of manufacture at a reasonable cost is thereby rendered commercially desirable.

To the accomplishment of these and related objects the provision resides in the construction, combination and arrangement of parts as shall be hereinafter more fully described, illustrated in the accompanying drawings and pointed out in the claims hereunto appended.

The invention will be best understood and can be most clearly described when reference is had to the drawings, forming a part of this disclosure wherein like characters indicate like parts throughout the several views.

In the drawings:—

Fig. 1 is a perspective view of the preferred form of the invention, showing the trap set for operation by the victim;

Fig. 2 is a longitudinal vertical section through the structure illustrated in Fig. 1 and indicating by dotted lines the position assumed by the operative parts of the trap when in their fully operated position;

Fig. 3 is a detail of the jaws of the trap, showing a modification of the victim engaging teeth;

Fig. 4 is a perspective view of a modified form of the trap with same set for operation by the victim;

Fig. 5 is a vertical longitudinal section through the structure shown in Fig. 4, showing the trap after operation thereof; and Fig. 6 is a bottom plan of the trap showing a slightly modified form of operating mechanism employed with either one of the forms of the trap, illustrated in Figs. 1 to 5 inclusive.

Referring more in detail to these drawings, it is to be understood that the platform 11 has downwardly turned ends 12 to form supporting means therefor, as shown clearly in Figs. 1, 2, 4, 5 and 6.

The platform 11 is provided with a longitudinal slot 13 extended from a point near one end, which may be termed the forward end, to a point about the longitudinal centre of the platform. Working in the slot 13 is the depending shank or neck 14 of the movable jaw plate 15. The shank or neck 14 extends centrally from the lower edge of the plate 15 and has an enlarged or widened flat lower end forming the head 16 which is considerably wider than the slot 13 and rides beneath the platform 11. The plate 15 also has outwardly and forwardly turned guide flanges 17 extended from its lower edge to ride on the upper face of the platform 11 and assist in retaining the plate 15 in a proper upright position and guiding the same during operation of the trap. Mounted on the inner or rear side of the movable jaw plate 15 is an angular plate 18 having an out-turned serrated edge or angle to form the jaw teeth 19 directed toward the stationary jaw plate 20 of the trap, and which will be later more fully described.

The latch plate 21 is secured by its forward up-turned end 22 to the rear face of the movable jaw plate 15, near the upper face of the platform 11 and the bifurcated rear end 23 of the latch plate 21 is extended through the slot 24 in the lower edge of the stationary upstanding jaw plate 20, as shown clearly in Figs. 1 and 2. The depending latch tongue 26, extending from the upper wall of the slot 24 depends sufficiently to engage in the bifurcated end 23 of the latch plate 21, when the latter is set for release by the victim, as illustrated in the 1st and 2nd views of the drawings. It will also be seen from Fig. 2 that the lower extremity of the latch tongue 26 is curved rearwardly to permit easy disengagement of the latch plate 21 when depressed by the victim. It will also be seen clearly from the drawings that the upstanding stationary jaw plate 20 has the tooth carrying plate 27 mounted on its forward face with its serrated upper edge directed forwardly to provide the series of stationary jaw teeth 28 for co-operation with the movable jaw teeth 19, previously described. It is also apparent from Figs. 1 and 2 that the stationary jaw plate 20 is mounted firmly in position on the platform 11 by rearwardly turned extensions 29 provided at the lower edge of the plate 20 and fastened on the upper face of the platform 11, thus mounting the plate 20 adjacent the rear end of the slot 13 and transversely of the platform 11. An inclined guide and shield 30 is mounted on the platform 11, rearwardly of the plate 20 and is secured longitudinally and centrally on the platform 11, by out-turned and downwardly offset longitudinal flanges 31. When the latch plate 21 is in set position as illustrated, the rear bifurcated end extends slightly into the open forward end of the guide and shield 30. When the latch plate 21 is released by the victim pressing thereon, the spring 32, beneath the platform 11 and having one end connected to one downturned end 12 of the platform 11 and its other end connected with the head 16 of the movable jaw plate 15, will immediately act to draw the movable jaw plate 15 toward the stationary jaw plate 20, thus causing the teeth 19 and 28 to co-operate in gripping and retaining the victim. During this movement of the movable jaw plate 15, the latch plate 21 moves rearwardly through the guide and shield 30. When the movable jaw plate 15 is in its fully closed position, the movable parts occupy the positions indicated by dotted lines in Fig. 2.

In Fig. 3, a slightly modified form of jaw teeth is illustrated, and by referring to this view, it will be seen that the plate 33 carrying the teeth for one of the jaw plates 34 has an outwardly directed edge 35 which is turned back on itself as shown at 36 and then bent to V-shaped form to provide the hollow or female teeth 37 for co-operation with the reverse and projecting or male teeth 38 provided on one edge of the plate 39 carried on the other jaw plate 40. It will, therefore, be seen that when this form of teeth is employed the teeth 37 and 38 will co-operate to firmly grip the animal with less danger of cutting the fur or penetrating the skin of the victim sufficiently to cause serious injury or damage.

In the form of the invention shown in Figs. 4 and 5 the victim engaging teeth are discarded and the rear stationary plate 20 is also dispensed with, and in place thereof a low plate 41 is provided near the rear end of the slot 13 in the platform 11 and is secured transversely on the upper face of the platform 11 by the rearwardly extended flanges 42 forming extensions of the lower edge of the plate 41, at the ends thereof. The main portion of the plate 41 is raised sufficiently to permit the bifurcated end 26 of the latch plate 21 to extend therebeneath. It will also be seen from Fig. 4 that an upwardly curved lip 43 is provided in the bifurcated end 26 of the latch plate 21 and adapted for engagement with the outer face of the plate 41 when the latch plate 21 is in set position for release by the victim, as illustrated in Fig. 4. An appropriate handle 44 is provided on the outer face of the movable jaw plate 15, whereby the latter may be readily drawn outwardly to its set position shown in Fig. 4.

In place of the inner stationary jaw plate 20 used in the preferred form, this modified form employs a reticulated cage 45 formed of wire mesh or the like, and having its edges reinforced by metallic strips 46 and which are secured on the upstanding flanges 47 carried on the longitudinal edges of the rear half of the platform 11. It is to be understood that the cage 45 has its forward end open while its rear end is closed and tongues or fingers 48 are struck out from the flanges 47 and the rear strip 46 and extended around wires of the body of the cage 45 to strengthen the cage by thoroughly uniting the body thereof with the flanges 47 of the rear strip 46.

When the latch plate 21 is depressed by the victim and thus released, the outwardly movable jaw plate 15 will travel towards the cage 45 and force the victim into the latter and automatically close the front or the forward end of the cage 45, as the latch plate 21 also slides under the plate 41 and into the lower portion of the cage 45 by the actuating spring spring 32, as described on the preferred form.

In Fig. 6, is illustrated a modified form or arrangement of the latch plate actuating means and this form is also shown in Fig. 5 and, as will be apparent, may be just as readily adapted to the preferred form.

In this form of operating means for the movable jaw plate 15, the spring 32 has one end connected with one of the downturned ends 12 of the platform 11 while its opposite end is connected with the short end 49 of the lever 50 which is mounted on the under face of the platform 11 near the other end thereof by means of the fulcrum 51, as shown clearly in Fig. 6. Pivoted to the other or long end of the lever 50 is one end of the link or connecting rod 52, which has its opposite end pivoted centrally to the head 16 on the depending neck 14 of the movable jaw plate 15.

This form of operating means provides for a lever action between the spring 32 and the movable jaw plate 15 operated thereby instead of a direct pull of the spring 32 on the movable jaw plate 15 as on the first form of operating means.

It is believed that complete construction and operation of the trap may now be apparent though it may be briefly stated that the principle is the same in all the forms as they each include a movable outer jaw plate and a latch plate spaced from a co-operating element or structure carried on the same platform on which the movable jaw plate operates and means for automatically moving the outer jaw plate toward the stationary element or structure when released by the victim pressing on the latch plate. The different forms of the various parts of the trap, as illustrated, may be readily substituted for one another in either structure without altering the principle of the operation or materially changing the general lay-out or construction of the trap.

From the foregoing description taken in connection with the accompanying drawings, it will be manifest that an animal trap is provided that will fulfill all the necessary requirements of such a device, but as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

1. An animal trap including a platform; a movable jaw plate operated along said platform, a latch plate connected with said movable jaw plate and normally held in set position; a spring connected with the latch plate by means of a lever and link for actuating said latch plate and said movable jaw plate when the latch plate is released by the victim; and means on said platform for co-operating with said movable jaw plate to retain the victim releasing the latch plate.

2. An animal trap including a platform; a movable jaw plate working thereon; a latch plate extending from said movable jaw plate; said movable jaw plate and said latch plate being normally retained in set position; a spring connected with the latch plate by means of a lever and link for operating said latch plate and said movable jaw plate when the latch plate is released by a victim pressing thereon; and means carried on said platform for co-operation with said movable jaw plate in retaining the victim releasing the latch plate.

3. An animal trap including a platform having down-turned ends and an elongated longitudinal slot; a movable jaw plate operable under the said slot and having a depending neck portion working thereon; a head formed on the lower end of the said neck portion and working on the underside of said platform; a latch plate extending from said movable outer jaw plate over said slot; said latch plate and outer movable jaw being normally held in set position; a spring connected with the latch plate by means of a lever and link connected with said head for operating said outer movable jaw plate and said latch plate when the latter is released by the victim pressing thereon; means for guiding said lach plate when released; and means on said platform for co-operation with said movable outer jaw plate in retaining the victim releasing the said latch plate.

4. An animal trap including a platform; a movable jaw plate operable thereon; means for guiding said jaw plate in its movement on said platform; a latch plate projecting from said movable jaw plate over said platform; means for retaining said latch plate in set position; a spring mounted on the underside of the platform and connected by a pivoted lever and a link to said movable jaw for operating the latter when released; means for guiding said outer movable jaw plate on said platform when the latch plate is re-released by the victim; and means for co-operating with said outer movable jaw plate in retaining the victim releasing said latch plate.

5. An animal trap including a platform; a movable outer jaw plate operated along said platform; a latch plate connected with said movable outer jaw plate and normally held in set position; resilient means attached to said latch plate to actuate the latter and said movable jaw plate when the latch plate is released by the victim; means on said platform for co-operating with said movable jaw plate to retain the victim releasing the latch plate; said means for co-operation with the outer movable jaw plate including an inner stationary jaw plate mounted on said platform; opposed male and female teeth carried on the opposed faces of said jaw plates for co-operation when the movable outer jaw plate moves toward the stationary inner jaw plate after the latch plate is released by the victim; and guide means for said latch plate on said platform.

6. An animal trap including a platform; a movable outer jaw plate working thereon; a latch plate extending from said movable jaw plate; said movable outer jaw plate and said latch plate being normally retained in set position; resilient means attached to said latch plate to actuate the latter and said movable jaw plate when the latch plate is released by a victim pressing thereon; means carried on said platform for co-operation with said movable jaw plate in retaining the victim releasing the latch plate; said means for co-operation with the outer movable jaw plate including an inner stationary jaw plate mounted on said platform; opposed male and female teeth carried on the opposed faces of said jaw plates for co-operation when the movable outer jaw plate moves toward the stationary inner jaw plate after the latch plate is released by the victim; and guide means for said latch plate on said platform.

7. An animal trap including a platform having down-turned ends and an elongated longitudinal slot; a movable jaw plate operable over the said slot and having a depending neck portion working thereon; a head formed on the lower end of the said neck portion and working on the underside of said platform; a latch plate extending from said movable outer jaw plate over said slot; said latch plate and outer movable jaw plate being normally held in set position; resilient means attached to said latch plate to actuate the latter for operating said outer movable jaw plate and said latch plate when the latter is released by the victim pressing thereon; means for guiding said latch plate when released; means on said platform for co-operation with said outer movable jaw plate in retaining the victim releasing the said latch plate; said means for co-operation with the outer movable jaw plate including an inner stationary jaw plate mounted on said platform; opposed male and female teeth carried on the opposed faces of said jaw plates for co-operation when the movable outer jaw plate moves toward the stationary inner jaw plate after the latch plate is realeased by the victim; and guide means for said latch plate on said platform.

8. An animal trap including a platform; a movable outer jaw plate operable thereon; means for guiding said jaw plate in its movement on said platform; a latch plate projecting from said movable jaw plate over said platform; means for retaining said latch plate in set position; resilient means attached to said latch plate to actuate the latter; guide means for said outer movable jaw plate on said platform when the latch plate is released by the victim; and means for co-operation with said outer movable jaw plate in retaining the victim releasing the said latch plate; said means for co-operation with the outer movable jaw plate including an inner stationary jaw plate mounted on said platform; opposed male and female teeth carried on the opposed faces of said jaw plates for co-operation when the movable outer jaw plate moves toward the stationary inner jaw plate after the latch plate is released by the victim; and guide means for said latch plate on said platform.

9. An animal trap including a platform; a movable outer jaw plate operated along said platform, a latch plate connected with said movable outer jaw plate and normally held in set position; means for actuating said latch plate and said movable outer jaw plate when the latch plate is released by the victim; means on said platform for co-operating with said movable outer jaw plate to retain the victim releasing the latch plate; a lever fulcrumed on the lower face of said platform and having one end connected directly to the spring employed for actuating said outer movable jaw plate and the latch plate when the latter is released; and a link connecting the other end of said lever directly to the depending head of said outer movable jaw plate.

In testimony whereof I hereunto affix my signature.

MICHAL BILINSKI.